UNITED STATES PATENT OFFICE.

ROBERT HOCHSTETTER, OF CINCINNATI, OHIO, ASSIGNOR TO THE AULT & WIBORG CO., OF CINCINNATI, OHIO, A CORPORATION OF OHIO.

MIMEOGRAPH-INK AND PROCESS OF MAKING SAME.

1,198,442.      Specification of Letters Patent.      Patented Sept. 19, 1916.

No Drawing.      Application filed February 4, 1914. Serial No. 816,489.

*To all whom it may concern:*

Be it known that I, ROBERT HOCHSTETTER, a citizen of the United States, and a resident of Cincinnati, in the county of Hamilton and State of Ohio, have invented certain new and useful Improvements in Mimeograph-Inks and Processes of Making Same; and I do hereby declare that the following is a full, clear, and exact description thereof.

This invention relates to a novel ink and process for producing the same and as described herein relates primarily to a blue or purple ink. The ink is designed particularly for use on a mimeograph or like machine, and especially for use on an oscillating or rotary mimeograph, and is intended to overcome certain disadvantages to be found in the mimeograph inks described in Letters Patent of the United States No. 928,195 and 928,450, heretofore granted to me on the 20th day of July, 1909.

The invention consists of the matters hereinafter described and more particularly pointed out in the appended claims.

One of the disadvantages of my prior patented inks resides in the fact that when exposed to the atmosphere, the ink, containing glycerin, will absorb moisture, so that when exposed in damp weather or in places where a moist temperature maintains, the ink becomes thin in body and tinctorially weak. As a result, the print made will be broad and weak in character and the letters will lack that degree of sharpness desirable in order to make the work on the mimeograph approximate the appearance of good work on a typewriting machine, which is the end aimed at in mimeograph work. In addition, in the case of the said prior ink, if an inked pad were allowed to remain on the mimeograph machine, the moisture absorbed by the ink would attack and corrode the cylinder with the result that in a comparatively short time the holes in the cylinder would become entirely plugged up, so as to prevent the pad from feeding the ink continuously through the stencil.

In carrying out the process to make my improved ink, I take a dye-stuff of the desired color, which in the case of purple mimeograph ink may be methyl violet 6-B (benzylpentamethyl-pararosanilin hydrochlorid: $C_{31}H_{34}N_3Cl$), or in the case of blue mimeograph ink may be Victoria blue "G" (hydrochlorid of phenyltetramethyl-triamido-diphenyl-a-naphthyl-carbinol: $C_{33}H_{32}N_3Cl$). Instead of the dye-stuffs the bases of the dye-stuffs may be used to produce a satisfactory ink. To the dye-stuff I add alcohol in quantities sufficient to dissolve the dye-stuff thoroughly, or to dissolve the base of the dye-stuff in case the said base is used. To this solution is preferably added linoleic acid, or any other acid capable of forming oil soluble colors, such as oleic acid, stearic acid or the like, and a small amount in proportion of phenol or of a similar solvent which will readily dissolve basic anilin colors, such as anilin, nitrobenzol or the like. To this solution I then add dry magnesia and a mineral oil of sufficient tack and viscosity to draw through the stencil, as say an oil of 18° Bé.

A homogeneous mixture of all the ingredients mentioned is made and the mixture is ground on an ink-mill until a smooth ink is obtained. During the grinding process the alcohol will be evaporated so as to free the mixture of all alcohol. At this stage it will be found that the ink has but little tinctorial strength. This is due to the fact that when the mineral oil is mixed with the alcoholic solution of the dye-stuff containing linoleic acid and the phenol, the mineral oil will throw the dye-stuff out of solution, even though the dye-stuff may have combined to some extent with the linoleic acid. I now add Turkey-red oil or other sulfonated oil and incorporate it thoroughly with the ground ink. The Turkey-red oil appears to take up the dye-stuff and develop its inherent, tinctorial strength. The ink thus produced may be found to be a little too thick and heavy in body for ordinary use and may be diluted by the addition of the necessary amount of the mineral oil of the kind already used. The result is a free flowing, limpid ink.

If the mineral oil is added to the alcoholic solution of the dye-stuff or of the dye-stuff base containing the linoleic acid and phenol without the addition of some pigment such as dry magnesia, (magnesia carbonate) as above described, there is a tendency for the dye-stuff to drop out in a resinous form so that the resulting ink would not be smooth and bright. The addition of the dry magnesia or of a like pigment appears to tend to allow the dye-stuff to fall out in a very finely divided form so that the grinding brings the mixture into the form of a fine, bright, smooth ink.

The improved ink, as appears from the above description, is an oil ink as distinguished from the inks described in the above referred to prior patents, which may be called glycerin inks. Being free from glycerin, the improved ink is not hydroscopic and will therefore not be affected by the moisture in the atmosphere.

As a specific example of how to make my improved ink I proceed as follows: I take 2½ pounds of dye-stuff (methyl violet 6-B, or Victoria blue "G"); add 5 pounds of alcohol and dissolve the dye-stuff thoroughly. To this solution I add 2 pounds of linoleic acid and ½ pound of phenol. I then add 15 pounds of dry magnesia and 30 pounds of mineral oil of 18° Bé. and mix all the ingredients thoroughly. This mixture is ground, until smooth, in an ink-mill. I then add 10 pounds of Turkey-red oil or other sulfonated oil and incorporate it thoroughly with the ground ink. 50 pounds of mineral oil of 18° Bé. is then added and thoroughly mixed. This produces the ink.

The ink produced is capable of remaining moist in the pad for weeks at a time and of feeding continuously through the pad while at the same time it will not gum or thicken upon exposure to the air. It will set rapidly even on hard surfaced paper,—such as bond paper—and will adhere to the paper so strongly that it cannot be rubbed after the print has stood over night. The ink flows freely without the slightest tendency to take on a buttery body, and yet the oily outline which may appear on thin paper when the printed sheet is held to the light is reduced to a minimum. The ink is of such construction that it will not affect either the cylinder or the stencil, will not settle when standing in the can and always remains in the same condition without any chemical reaction between its constituent parts. With all these characteristics it is capable of producing a print of a bright shade approximating that of good typewriter work.

I claim as my invention:—

1. The process of producing colored inks for mimeographs and the like which consists in dissolving a dye-stuff of the desired color, or its base, in alcohol, adding to the solution a mineral oil, then mixing and grinding and adding Turkey-red oil.

2. The process of producing colored inks for mimeographs and the like which consists in dissolving a dye-stuff of the desired color, or its base, in alcohol, adding to the solution a mineral oil, then mixing and grinding, adding Turkey-red oil and then diluting with mineral oil of the kind already used.

3. The process of producing colored inks for mimeographs and the like which consists in dissolving a dye-stuff of the desired color, or its base, in alcohol, adding an acid capable of forming oil soluble colors and a small proportion of a solvent for basic anilin colors, adding to the solution a mineral oil, mixing and grinding and then adding Turkey-red oil.

4. The process of producing colored inks for mimeographs and the like which consists in dissolving a dye-stuff of the desired color, or its base, in alcohol, adding an acid capable of forming oil soluble colors and a small proportion of a solvent for basic anilin colors, adding to the solution a mineral oil, mixing and grinding, then adding Turkey-red oil and then diluting with the mineral oil of the kind already used.

5. The process of producing colored inks for mimeographs and the like which consists in dissolving a dye-stuff of the desired color, or its base, in alcohol, adding an acid capable of forming oil soluble colors and a small proportion of a solvent for basic anilin colors, adding to the solution a pigment and a mineral oil, then mixing and grinding and then adding Turkey-red oil.

6. The process of producing colored inks for mimeographs and the like which consists in dissolving a dye-stuff of the desired color, or its base, in alcohol, adding an acid capable of forming oil soluble colors and a small proportion of a solvent for basic anilin colors, adding to the solution a pigment and a mineral oil, then mixing and grinding, then adding Turkey-red oil and then diluting with mineral oil of the kind already used.

7. The process of producing colored inks for mimeographs and the like which consists in dissolving a dye-stuff of the desired color, or its base, in alcohol, adding an acid capable of forming oil soluble colors and a small proportion of a solvent for basic anilin colors, adding to the solution dry magnesia and a mineral oil, then mixing and grinding, and then adding Turkey-red oil.

8. The process of producing colored inks for mimeographs and the like which consists in dissolving a dye-stuff of the desired color, or its base, in alcohol, adding an acid capable of forming oil soluble colors and a small proportion of a solvent for basic anilin colors, adding to the solution dry magnesia and a mineral oil, then mixing and grinding, then adding Turkey-red oil and then diluting with the mineral oil of the kind already used.

9. The process of producing colored inks for mimeographs and the like which consists in dissolving a dye-stuff of the desired color, or its base, in alcohol, adding linoleic acid and a small portion of phenol, adding to the solution dry magnesia and a mineral oil, then mixing and grinding and then adding Turkey-red oil.

10. The process of producing colored inks for mimeographs and the like which consists in dissolving a dye-stuff of the desired color, or its base, in alcohol, adding linoleic acid and a small portion of phenol, adding to the solution dry magnesia and a mineral oil, then mixing and grinding, then adding Turkey-red oil and then diluting with the mineral oil of the kind already used.

11. A colored mimeograph ink comprising a dye-stuff or its base, a mineral oil and Turkey-red oil.

12. A colored mimeograph ink comprising a dye-stuff or its base, an acid capable of forming oil soluble colors, a small proportion of a solvent for basic anilin colors, a mineral oil and a Turkey-red oil.

13. A colored mimeograph ink comprising a dye-stuff or its base, an acid capable of forming oil soluble colors, a small proportion of a solvent for basic anilin colors, a pigment, a mineral oil and Turkey-red oil.

14. A colored mimeograph ink comprising a dye-stuff or its base, an acid capable of forming oil soluble colors, a small proportion of a solvent for basic anilin colors, magnesium carbonate, a mineral oil and Turkey-red oil.

15. A colored mimeograph ink comprising a dye-stuff or its base, linoleic acid, a small proportion of phenol, magnesium carbonate, mineral oil and Turkey-red oil.

16. A blue or purple mimeograph ink comprising a blue or purple dye-stuff or its base, linoleic acid, a small proportion of phenol, magnesium carbonate, mineral oil and Turkey-red oil.

In testimony that I claim the foregoing as my invention I affix my signature in the presence of two witnesses, this 19th day of January, A. D. 1914.

ROBERT HOCHSTETTER.

Witnesses:
CHARLES AULT MANSELL,
SIDNEY ALFRED WRIGHT.